United States Patent [19]

Rodaway

[11] 4,157,123

[45] Jun. 5, 1979

[54] WHEELCHAIR ELECTRICAL CONTROL CIRCUIT

[75] Inventor: Keith S. Rodaway, Santa Monica, Calif.

[73] Assignee: Everest & Jennings, Inc., Los Angeles, Calif.

[21] Appl. No.: 883,574

[22] Filed: Mar. 6, 1978

[51] Int. Cl.² .............................................. B62D 11/04
[52] U.S. Cl. ............................... 180/6.5; 180/DIG. 3; 318/258; 318/380
[58] Field of Search .................... 180/6.5, 6.48, 6.2, 180/77 H, 65 R, DIG. 3; 318/380, 258, 269, 103, 53, 54, 56, 57, 63

[56] References Cited

U.S. PATENT DOCUMENTS 3,872,945  3/1975  Hickman et al. .................. 180/65 R Primary Examiner—Joseph F. Peters, Jr.
Assistant Examiner—R. Schrecengost
Attorney, Agent, or Firm—Ralph B. Pastoriza

[57] ABSTRACT

The normally provided manually operable switch lever on an electrically drive wheelchair incorporates pairs of switch arms so that additional circuitry can be provided for interconnection with the normally provided left and right wheel drive motors. This additional circuitry comprises electrical resistances arranged to be connected across the motor leads by the manually operable switch when in an unactuated position for the particular motor in question. The provision of these resistances across the motor leads when the motors are unenergized results in absorption of back voltage spikes to thereby avoid burning out the switch means, dynamic braking when the motors acts as generators as a result of the wheelchair coasting, easier steering control when only one of the motors is energized to effect a turn, and permits the use of permanent magnet type d.c. motors for the left and right wheel drive motors.

4 Claims, 4 Drawing Figures

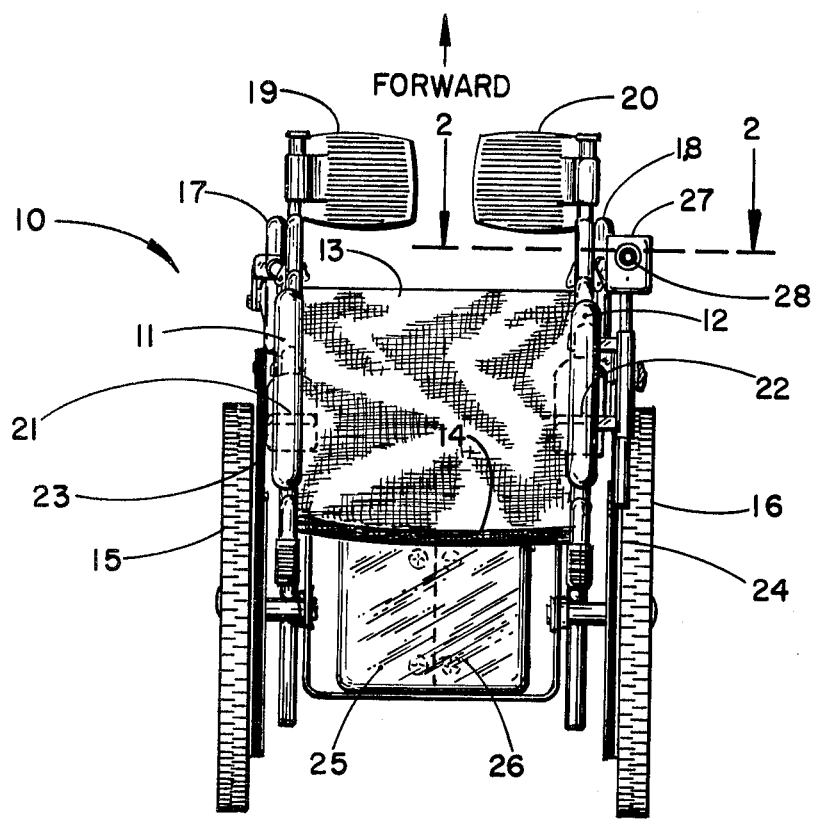
FIG. 1
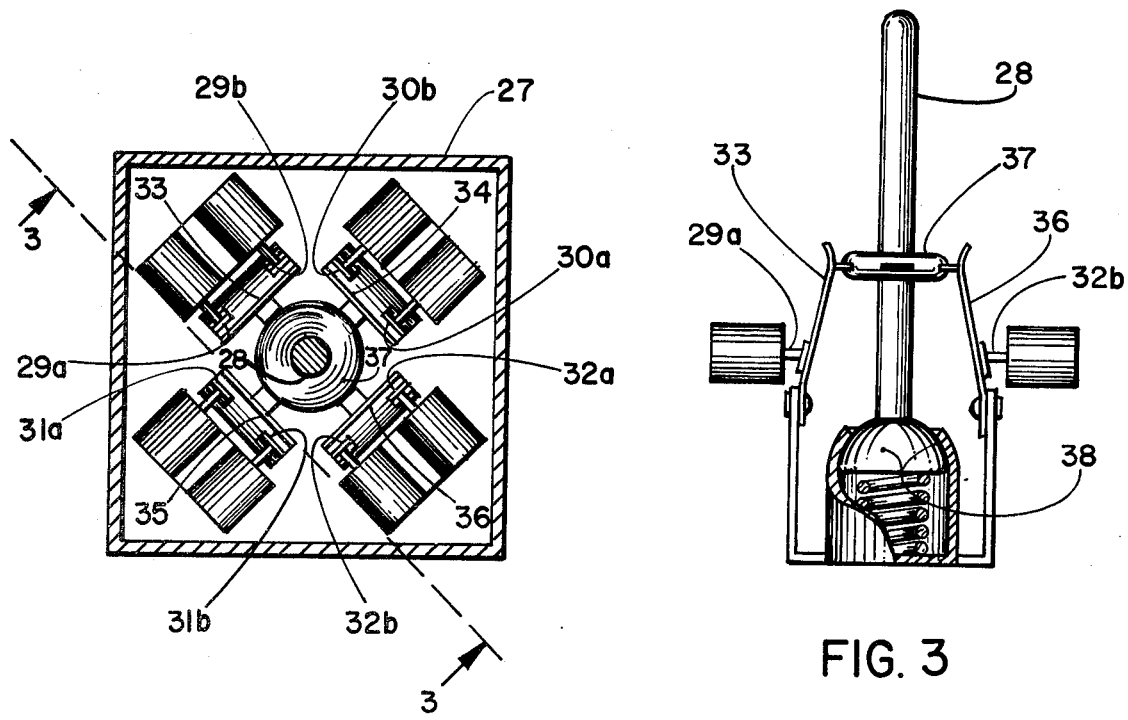
FIG. 2
FIG. 3

4,157,123

WHEELCHAIR ELECTRICAL CONTROL CIRCUIT

This invention relates generally to wheelchairs and more particularly to a wheelchair electrical control circuit in which the risk of electrical damage is minimized and wherein improved operation of the chair results.

BACKGROUND OF THE INVENTION

Electrically powered wheelchairs are well known in the art and generally include two electric motors. One motor is connected for driving the left large diameter rear wheel of the wheelchair and the other connected to drive the right large rear wheel of the wheelchair. By providing an appropriate switching arrangement which can be operated by a patient in the wheelchair, the chair can be driven directly forwardly by energizing both motors simultaneously. Turning to the right or left is accomplished by, respectively energizing the left wheel motor or the right wheel motor. Rearward movement of the wheelchair is accomplished by reversing the polarity of battery energy to the motors to rotate them in an opposite direction to drive the chair backwards. In place rotation or swivelling of the wheelchair can be accomplished by driving the left motor in one direction and the right motor in an opposite direction.

Preferably, the left and right wheel drive motors constitute permanent magnet d.c. motors. However, these motors have the characteristic of operating as a generator when the wheelchair is coasting thereby sending current back through the various control switches and oftentimes burning them out. To avoid this problem, wheelchairs have been designed with motors utilizing a field winding rather than a permanent magnet. When the motor is de-energized, the magnetic field generated by the field winding is also removed so that the problem of the motors acting as generators is avoided. On the other hand, upon de-energizing the motors, the field generated by the field winding collapses and gives rise to large reverse voltage spikes which in turn can damage the sensitive micro switches utilized in the switching system.

Further difficulties are also experienced with presently available electrically driven wheelchairs whether permanent magnet type or field wound motors are used. For example, in executing a right hand turn, the operator would normally energize only the left drive wheel motor. The right drive wheel motor would then simply coast and unless some braking friction were applied to the right wheel, controlling of the turning is somewhat difficult. Similar difficulties are encountered for the same reasons when a left turn is being made. Finally, aside from the problem of the motors acting as generators when the wheelchair is coasting, the coasting condition itself can be dangerous if the only means for slowing down the wheelchair is the throwing of the motors in reverse.

BRIEF DESCRIPTION OF THE PRESENT INVENTION

With the foregoing considerations in mind, the present invention contemplates an improved wheelchair electrical control circuit essentially overcoming the problems of prior art control circuits.

More particularly, the present invention provides a circuit in which permanent magnet type d.c. motors can be utilized thereby avoiding field windings and attendant voltage spikes when these motors are turned off but wherein the action of the motors as generators is utilized to advantage rather than as a disadvantage as is the case with prior art permanent magnet type motors.

Briefly, in its basic form, there is provided in combination with an electically driven wheelchair including a wheel drive motor means, battery means and switch means for energizing the motor means from the battery means when actuated, an electrical resistance means together with circuit means connected between the motor means and switch means such that the electrical resistance means is connected across the leads to the motor means when the switch means is in an unactuated or de-energizing position and is disconnected from across the leads to the motor means when the switch means is actuated.

In the preferred embodiment, the resistance means takes the form of first and second resistances connected to shunt the negative and positive input leads to the right and left wheel drive motors when these motors are unactuated.

With the foregoing arrangement, switch burn out is prevented by absorption of generated current when the wheelchair is coasting. Moreover, the resistances provide for dynamic braking of the wheelchair under coasting conditions thereby greatly aiding in control of the same. Moreover, easier steering control is afforded when only one of the motors is energized to effect a turn, the resistance shunting the unactuated motor again providing a dynamic braking action permitting easier control of the turning with less turning arc.

Should the drive motors utilize field windings rather than permanent magnets, the provision of the resistances will absorb voltage spikes which occur when the field collapses thereby again protecting the switches. In the case of permanent magnet d.c. motors, the resistances control the generated current resulting under coasting conditions all as described.

BRIEF DESCRIPTION OF THE DRAWINGS

A better understanding of this invention will be had by now referring to the accompanying drawings in which:

FIG. 1 is a top plan view partly broken away of an electrically operated wheelchair illustrating basic components for driving the chair;

FIG. 2 is a plan cross section of switch means utilized in the chair of FIG. 1 looking generally in the direction of the arrows 2—2;

FIG. 3 is a cross section showing certain ones of the components of the switch of FIG. 2 looking in the direction of the arrows 3—3 of FIG. 2; and, FIG. 4 is an electrical circuit diagram illustrating the electrical control circuit of this invention.

DETAILED DESCRIPTION OF THE PREFERRED EMBODIMENT

Figure 4:
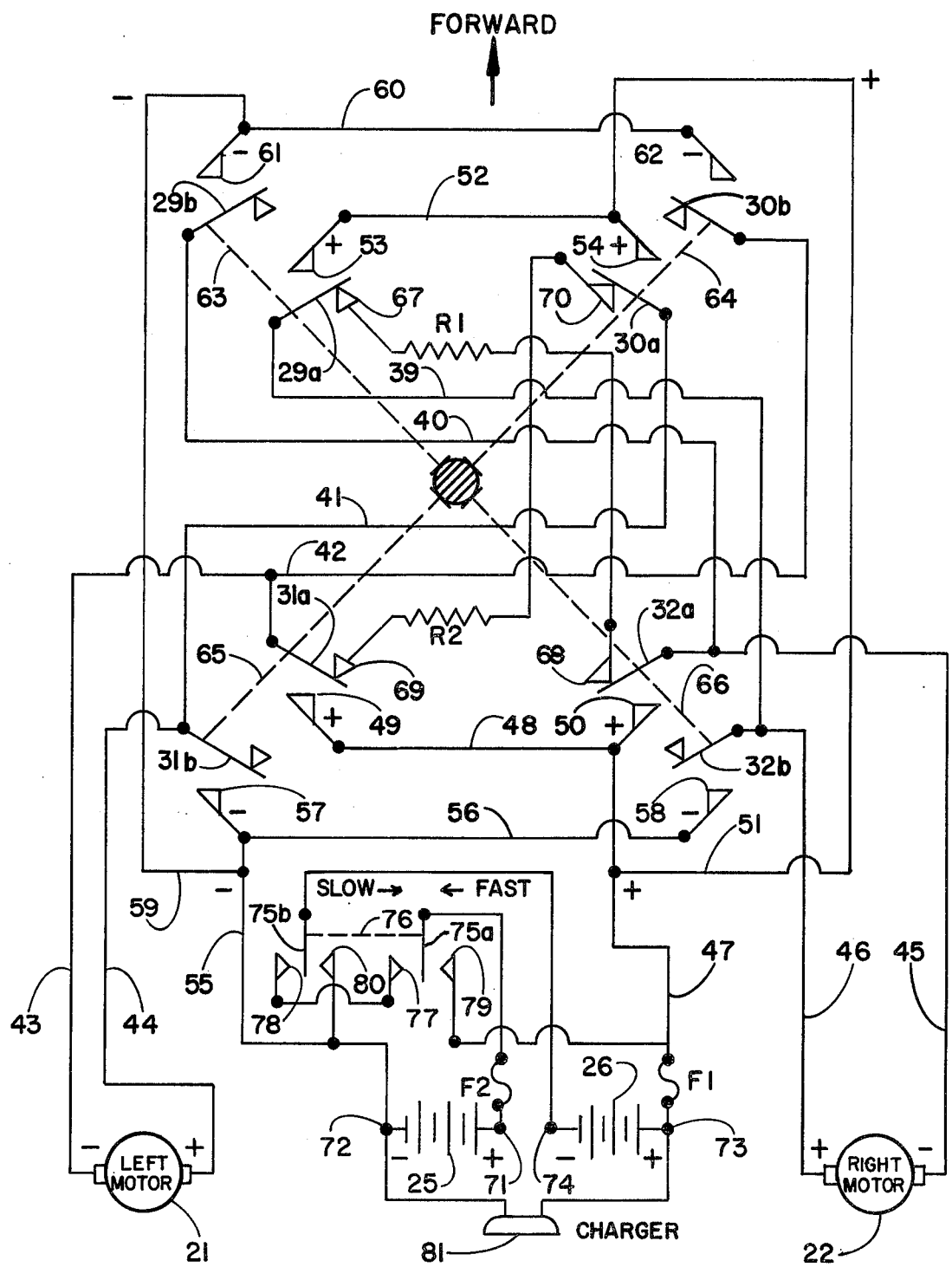

Referring to the plan view of FIG. 1, the electrically operated wheelchair is designated generally by the numeral 10 and includes the usual left and right arm rests 11 and 12, seat 13 and back 14.

The large diameter left and right rear wheels for the chair are indicated at 15 and 16 and the normally provided front left and right caster wheels partially shown at 17 and 18. Foot rests 19 and 20 are shown in extended position. The forward directional motion of the chair is indicated by the arrow at the top of FIG. 1.

A left wheel drive motor is shown at 21 and a right wheel drive motor shown at 22. These motors respectively individually connect through appropriate drive transmissions such as chain drives 23 and 24 to individually drive the left and right rear wheels 15 and 16. Appropriate battery means such as a pair of 12-volt type storage batteries 25 and 26 are shown carried on the lower rear portion of the chair.

A manually operable switch means shown enclosed within a casing 27 includes a vertically extending lever 28, this switch means being attachable to any suitable portion of the wheelchair frame. Normally, assuming the patient has good use of his right hand, the manually operable switch means will be disposed adjacent to the forward portion of the right arm rest 12 as shown.

Referring now to the cross section of FIG. 2, further details of the switch means will become evident. This switch means includes left forward, right forward, left rearward and right rearward pairs of switch arms 29a, 29b; 30a, 30b; 31a, 31b; and 32a, 32b, respectively positioned about the vertically extending lever 28 as shown. The first and second switch arms making up each pair are arranged to be operated simultaneously as by a common spring plate such as illustrated at 33 for the first and second switch arms 29a and 29b. Similar spring plates are shown at 34 for the right forward pair of switches, spring plate 35 for the left rearward pair of switches, and spring plate 36 for the right rearward pair of switches. The spring plates themselves are positioned to be engaged by an annular enlargement 37 on the vertical lever 28.

FIG. 3 illustrates in full view the vertically extending lever 28 with the annular enlargement 37 positioned to engage the spring plates 33 and 36 for the left forward and right rearward pairs of switches respectively. In FIG. 3, there is provided a universal mounting 38 for the lower end of the lever 28 so that it can tilt forwardly, rearwardly, to the left and to the right and in diagonal directions therebetween so that the annular enlargement 37 moves generally in an horizontal plane.

Referring back again to FIG. 2, the positioning of the various switch pairs relative to the lever 28 is such that appropriate switches will be operated to drive the wheelchair in a direction corresponding to the tilting direction of movement of the lever.

Thus, the left forward and right forward pairs of switch arms can be simultaneously actuated to close upon forward movement of the lever 28. Similarly, the left rearward and right rearward pairs of switch arms can be simultaneously actuated to close upon rearward movement of the lever. The left forward and left rearward pairs of switch arms can be simultaneously actuated to close upon direct leftward movement of the lever and the right forward and right rearward pairs of switch arms can be simultaneously actuated to close upon rightward movement of the lever. Moreover, any one of the pairs of switch arms can be actuated to close without the remaining pairs of switch arms being actuated by moving the lever in a diagonal direction directly towards the one of the pairs.

By connecting the left forward pairs of switch arms 29a and 29b to energize the right wheel drive motor when closed and the right forward pairs of switch arms 30a and 30b to energize the left wheel drive motor when closed, it will be evident that direct forward movement of the lever 28 to close the left forward and right forward pairs of switch arms all simultaneously will drive the wheelchair forward, both motors being energized to drive both rear wheels in a forward direction. The left rearward and right rearward pairs of switch arms operate similarly but reverse the polarities to the motors so that direct rearward movement of the lever 28 drives both motors in a reverse direction to move the wheelchair rearwardly.

When the lever 28 is moved directly leftwardly to actuate the left forward pair of switch arms and the left rearward pair of switch arms, the right wheel drive motor is energized in a forward direction and the left wheel drive motor energized in a reverse direction to cause the chair to swivel immediately to the left. A similar swivelling action will occur if the lever 28 is moved directly to the right to engage simultaneously the right forward and right rearward pairs of switch arms.

If the lever 28 is moved diagonally so as to engage for example the left forward pair of switch arms only, then the right wheel drive motor only will be energized causing the chair to turn gradually to the left or in the direction of movement of the lever 28. Similarly, engaging only the right forward pair of switch arms by the lever 28 will energize only the left wheel drive motor and cause a gradual turning to the right.

The control circuit means itself interconnecting the switch means with the motors and battery means to drive the wheelchair as described and to provide the further improved features in accord with this invention will now be described in detail with reference to FIG. 4.

In the schematic wiring diagram of FIG. 4, the various switch arms which are really in the form of micro switch control buttons as illustrated in FIG. 2, are positioned relative to the vertical control lever 28 in a manner corresponding to that shown in FIG. 2 except that the first and second arms making up each pair are shown in tandem for convenience in describing the writing circuit.

Thus, the left forward pairs of switch arms 29a and 29b are designated by the same numerals in FIG. 4 at the upper left portion of the drawing. The remaining pairs of switch arms are similarly designated by the same numerals, actuation of the switch arms to close being accomplished by movement of the lever 28 shown in cross section at the center along the direction of the dashed lines.

Referring now specifically to the upper central portion of FIG. 4, the circuit means includes a first pair of leads 39 and 40 connecting a first switch arm 29a of the left forward pair of switch arms to the second switch arm 32b of the right rearward pair of switch arms, and the second switch arm 29b of the left forward pair of switch arms to the first switch arm 32a of the right rearward pair of switch arms, respectively.

A second pair of leads 41 and 42 connect the first switch arm 30a of the right forward pair of switch arms to the second switch arm 31 of the left rearward pair of switch arms, and the second switch arm 30b of the right forward pair of switch arms to the first switch arm 31a of the left rearward pair of switch arms, respectively.

Referring now to the lower left of FIG. 4 there is schematically indicated the left wheel drive motor 21 together with negative and positive input leads 43 and 44 connecting to the first and second switch arms 31a and 31b of the left rearward pair of switch arms respectively.

The negative and positive right wheel drive motor leads for the right motor 22 shown in the lower right of FIG. 4 are designated 45 and 46 and connect respectively to the first switch arm 32a and second switch arm 32b of the right rearward pair.

A positive battery lead is shown in the lower right portion of FIG. 4 at 47 passing from the positive terminal of the battery 26 to a common lead 48 connecting to positive terminals 49 and 50, and through a branch lead 51 passing to the right and upwardly to FIG. 4 to a common lead 52 terminating in positive terminals 53 and 54. The positive terminals 49, 50, 53 and 54 are respectively positioned for engagement by the first one of the respective pairs of switch arms when actuated by the lever 28; that is, by the switch arms 31a, 32a, 29a, and 30a.

A negative battery lead shown at the lower left of FIG. 4 at 55 and connecting from the negative terminal of the battery 25 passes to a common lead 56 to terminate in first and second negative terminals 57 and 58, and by way of a branch lead 59 extending upwardly to the left of the drawing in FIG. 4 to a common lead 60 terminating in negative terminals 61 and 62. The negative terminals 57, 58, 61, and 62 are positioned to be engaged by the second one of the respective pairs of switch arms when actuated by the lever 28; that is, by the second switch arms 31b, 32b, 29b and 30b respectively. The first and second switch arms of each of the pairs are ganged together for simultaneous operation as indicated by the dashed lines 63,64 65 and 66.

The principal portion of the described control circuit is completed by the provision of a first electrical resistance R1 connected between first and second neutral terminals 67 and 68 positioned to be engaged by the first switch arms of the left forward and right rearward pairs of switch arms, 29a and 32a respectively, when in their unactuated illustrated positions; and a second electrical rsistance R2 connected between third and fourth neutral terminals 69 and 70 positioned to be engaged by the first switch arms of the left rearward and right forward pairs of switch arms, 31a and 30a respectively when in their unactuated illustrated positions.

In the particular embodiment illustrated in FIG. 4, the battery means comprises two 12-volt batteries such as indicated and described at 25 and 26. Each of these batteries includes positive and negative terminals 71, 72 and 73, 74 respectively. A fast-slow switch means comprising first and second switch arms 75a and 75b ganged as indicated at 76 is provided to interconnect the positive and negative battery or power leads 47 and 55 to the batteries 25 and 26 in the following manner:

When the switch arms 75a and 75b are thrown to the left as illustrated in FIG. 4 to engage switch terminals 77 and 78 respectively, the batteries 25 and 26 will be connected in series between the positive and negative power or battery leads 47 and 55 this series connection readily being traced through the switch arms.

When the switch arms 75a and 75b are thrown to the right as viewed in FIG. 4, the batteries 25 an 26 will be connected in parallel with the positive and negative power or battery leads 47 and 55. Again, these connections are evident by tracing the circuit through the switch arms.

If the batteries 25 and 26 are each 12 volts, when they are connected in series, 24 volts will be supplied across the leads 47 and 55 to drive the left and right motors at a relatively fast speed. When the batteries 25 and 26 are connected in parallel, only 12 volts will be provided across the leads 47 and 55 thereby reducing the speed of the motors.

A handy speed control for the electrically driven wheelchair is thus provided by the foregoing circuit.

OPERATION

Still referring to FIG. 4, when a patient in the wheelchair wishes to operate the chair, he will first throw the fast-slow switch means to either the left or right positions described depending upon whether he wants to operate the wheelchair rapidly or slowly. After this switch has been positioned on one or the other pairs of terminals 77, 78 or 79, 80 there will be available 24 or 12 volts on the battery leads 47 and 55 and thus on the four positive terminals 49, 50, 53 and 54.

With the manually operable vertically extending lever 28 biased to its center vertical upright position as by the various spring plates described in FIGS. 2 and 3 associated with the various switch pairs, the switch arms will be in the positions illustrated in FIG. 4 and no power will be applied to the left and right wheelchair motors. However, in this unactuated condition, it will be evident that the first and second resistances R1 and R2 are connected across the input motor leads 45 and 46 for the right motor and 43 and 44 for the left motor respectively.

If now the patient wishes to move straightforwardly as indicated by the forward arrow in FIG. 4, he will tilt the lever 28 in a directly forward direction to simultaneously close the left forward and right forward pairs of switch arms 29a. 29b and 30a, 30b. The first switch arms of these pairs 29a and 30a will thus engage the positive terminals 53 and 54 respectively while the second switch arms 29b and 30b will engage the negative terminals 61 and 62 respectively. Power will thus be provided from the branch leads 51 and 59 connecting the battery leads 47 and 55 to the common leads 52 and 60, respectively. This energy will thus pass through the first and second switch arms 29a and 29b to the negative and positive leads 45 and 46 for the right motor and through the switch arms 30a and 30b to the negative and positive input leads 43 and 44 for the left motor 21 so that both motors are energized to drive the wheelchair forwardly so long as the lever 28 is held in its forward tilted position.

If the lever 28 is tilted directly rearwardly, the left rearward and right rearward switch arms will be thrown to engage the positive terminals 49 and 50 and the negative terminals 57 and 58 respectively thereby providing reverse polarity energy to the right and left motor input leads 45, 46 and 43, 44 respectively. This reverse polarity will cause these motors to rotate in an opposite direction and thus drive the wheelchair directly rearwardly.

When the lever 28 is moved directly to the left or to the right, all as described heretofore, the left forward switch arms and left rearward switch arms will all be simultaneously closed to cause swivelling to the left or, the right forward and right rearward switch arms will be closed to cause direct swivelling to the right.

Where only one pair of switch arms is actuated by a diagonal tilting movement of the lever 28, only one of the motors will be energized thereby providing the desired steering capability.

It will be appreciated from the circuit as described that when either the left or right motor 21 or 22 is de-energized, one or the other of the resistances R2 or R1 will shunt the motor input leads 43, 44 or 45, 46. Thus, any generated electrical current on these leads as a result of coasting of the wheelchair or positive rotation of the wheel while the connected motor is de-energized will be absorbed by the resistance thereby providing a dynamic braking action.

In addition, the resistances will function as current limiters and thus avoid the generated current from burning out the micro switches making up the various switch arm pairs.

Finally, these resistances permit the use of permanent magnet type d.c. motors so that there is avoided the sharp voltage spikes generated by collapsing fields. However, even if a field winding is employed, these resistances would absorb such voltage spikes and thus protect the sensitive micro switches.

As also described heretofore, the dynamic braking characteristic provided by the resistances will provide for a greater control during gradual turns of the wheelchair; that is, where only one of the motors is operating and the other one is unactuated. In other words, for the unactuated motor the presence of the resistance acting on the generated current by the unactuated motor will provide a braking action facilitating controlling of the turn so that such turning can be executed in a lesser arc than otherwise.

From all of the foregoing, it will thus be evident that the present invention has provided an improved electrical control circuit for electrically operated wheelchairs overcoming various problems associated with presently available electrically operated chairs.

I claim:

1. An electrical control circuit for a wheelchair including left and right d.c. wheel motors, battery means and manually operable switch means for energizing the motors from the battery means, said circuit including, in combination:
   (a) a first resistance connected to shunt the negative and positive input leads of the right wheel motor when the portion of the switch means for energizing said right wheel motor is unactuated; and
   (b) a second resistance connected to shunt the negative and positive input leads of the left wheel motor when the portion of the switch means for energizing said left wheel motor is unactuated whereby back voltage spikes generated when the motors are deenergized are absorbed in the resistances respectively to thereby protect the switch means against burn-out, dynamic braking is provided when the motors act as generators as a result of the wheelchair coasting, easier steering control is afforded when only one of the motors is energized to effect a turn and permanent magnet type d.c. motors can be utilized for said left and right wheel motors.

2. A control circuit according to claim 1, in which said switch means includes left forward, right forward, left rearward and right rearward pairs of switch arms, actuation of the left forward and right forward pairs of switch arms energizing said right and left wheel motors to drive the wheelchair forwardly, and actuation of the left rearward and right rearward pairs of switch arms reversing the polarity of the energy supplied by said battery means to said left and right wheel motors to reverse their rotational direction and drive the wheelchair rearwardly, said resistances being connected between neutral terminals engaged respectively by one of the switch arms of each pair when in unactuated positions.

3. A wheelchair electrical control circuit including, in combination:
   (a) a wheelchair having a left wheel drive motor and a right wheel drive motor;
   (b) battery means for providing electrical energy to the motors carried on said wheelchair;
   (c) manually operable switch means on said wheelchair including:
      (1) a vertically extending lever universally mounted for tilting movement in forward, rearward, leftward and rightward directions and diagonal directions therebetween generally in an horizontal plane; and,
      (2) left forward, right forward, left rearward and right rearward pairs of switch arms positioned about said lever such that said left forward and right forward pairs of switch arms can be simultaneously actuated to close upon forward movement of said lever, said left rearward and right rearward pairs of switch arms can be simultaneously actuated to close upon rearward movement of said lever, said left forward and left rearward pairs of switch arms can be simultaneously actuated to close upon leftward movement of said lever and said right forward and right rearward pairs of switch arms can be simultaneously actuated to close upon rightward movement of said lever, and wherein any one of said pairs of switch arms can be actuated to close without the remaining pairs of switch arms being actuated by moving said lever in a diagonal direction directly towards the said one of said pairs; and
   (d) circuit means interconnecting the switch means with the motors and battery means to drive said wheelchair, said circuit means including:
      (1) a first pair of leads connecting a first switch arm of the left forward pair of switch arms to a second switch arm of the right rearward pair of switch arms, and the second switch arm of the left forward pair of switch arms to the first switch arm of the right rearward pair of switch arms, respectively;
      (2) a second pair of leads connecting a first switch arm of the right forward pair of switch arms to a second swith arm of the left rearward pair of switch arms, and a second switch arm in the right forward pair of switch arms to the first switch arm in the left rearward pair of switch arms, respectively;
      (3) negative and positive left motor leads connected to the first and second switch arms of said left rearward pair of switch arms respectively;
      (4) negative and positive right motor leads connected to the first and second switch arms of said right rearward pair of switch arms respectively;
      (5) positive battery leads connecting to positive terminals positioned to be engaged by the first one of the respective pairs of switch arms when actuated by said lever;
      (6) negative battery leads connecting to negative terminals positioned to be engaged by the second one of the respective pairs of switch arms when actuated by said lever, the first and second switch arms of each pair being ganged together for simultaneous movement;
      (7) a first electrical resistance connected between first and second neutral terminals positioned to be engaged by the first switch arms of said left forward and right rearward pairs of switch arms when in unactuated position; and (8) a second electrical resistance connected between third and fourth neutral terminals positioned to be engaged by the first switch arms of said right forward and left rearward pairs of switch arms when in unactuated position, whereby when said lever is in a central neutral position so that none of said switch arms is actuated, said first electrical resistance is connected between said negative and positive right motor leads and said second electrical resistance is connected between said negative and positive left motor leads so that back voltage spikes generated when the motors are de-energized are absorbed in the resistances respectively to thereby protect the switch means against burn-out, dynamic braking is provided when the motors act as generators as a result of the wheelchair coasting, easier steering control is afforded when only one of the motors is energized to effect a turn, and permanent magnet type d.c. motors can be utilized for said left and right wheel drive motors.

4. A wheelchair according to claim 3, in which said battery means includes two batteries each having positive and negative terminals; and fast-slow switch means interconnecting said positive and negative battery leads to said terminals when in a first position to electrically connect said batteries in series between said leads, and interconnecting said positive and negative battery leads to said terminals when in a second position to electrically connect said batteries in parallel between said leads.

* * * * *